(12) United States Patent
Sheu et al.

(10) Patent No.: US 8,532,948 B2
(45) Date of Patent: Sep. 10, 2013

(54) CONTACTLESS SENSING DEVICE

(75) Inventors: Geeng-Jen Sheu, Taichung (TW);
San-Lin Young, Taichung (TW);
Heng-Hui Chen, Taichung (TW);
Shih-Hung Yeh, Changhua County (TW)

(73) Assignee: Geeng-Jen Sheu, Taichung (TW)

( * ) Notice: Subject to any disclaimer, the term of this patent is extended or adjusted under 35 U.S.C. 154(b) by 352 days.

(21) Appl. No.: 13/017,400

(22) Filed: Jan. 31, 2011

(65) Prior Publication Data

US 2011/0196635 A1 Aug. 11, 2011

(30) Foreign Application Priority Data

Feb. 11, 2010 (TW) .............................. 99104466 A

(51) Int. Cl.
*G06F 19/00* (2011.01)

(52) U.S. Cl.
USPC .......... 702/65; 702/56; 324/252; 324/207.14; 324/207.2; 324/207.24; 365/158; 365/226

(58) Field of Classification Search
USPC ............. 702/56, 65; 324/252, 750.3, 754.03, 324/207.2, 207.14, 207.24; 365/5, 158, 226; 360/324.2
See application file for complete search history.

(56) References Cited

U.S. PATENT DOCUMENTS

| | | | | |
|---|---|---|---|---|
| 5,793,201 A | * | 8/1998 | Nelle et al. | 324/207.14 |
| 5,901,018 A | * | 5/1999 | Fontana et al. | 360/324.2 |
| 6,035,169 A | * | 3/2000 | Miyake et al. | 399/258 |
| 6,300,617 B1 | * | 10/2001 | Daughton et al. | 250/214.1 |
| 7,324,369 B2 | * | 1/2008 | Chung et al. | 365/158 |
| 7,619,431 B2 | * | 11/2009 | De Wilde et al. | 324/750.3 |
| 2004/0207961 A1 | * | 10/2004 | Ichimura et al. | 360/324.2 |
| 2006/0187047 A1 | * | 8/2006 | Iwakata et al. | 340/572.3 |
| 2007/0063690 A1 | * | 3/2007 | De Wilde et al. | 324/117 R |
| 2007/0099031 A1 | * | 5/2007 | Chung et al. | 428/815 |
| 2007/0229067 A1 | * | 10/2007 | Sasaki et al. | 324/252 |
| 2008/0112214 A1 | * | 5/2008 | Chung et al. | 365/158 |
| 2008/0205110 A1 | * | 8/2008 | Boeve | 365/5 |

\* cited by examiner

*Primary Examiner* — Carol S Tsai
(74) *Attorney, Agent, or Firm* — WPAT, PC; Justin King

(57) ABSTRACT

A contactless sensing device comprises a magnetic stripe fixed on a tested object, a detector and a processor. The magnetic stripe has arranged plurality of N-pole and S-pole blocks. The detector includes a fixed magnetic layer with fixed magnetic direction, a free magnetic layer with changeable magnetic direction influenced by external magnetic field, and an insulating layer separated the fixed magnetic layer from the free magnetic layer. While the object is moving to make the magnetic stripe pass through the detector, the magnetic direction of the free magnetic layer is influenced by the N-pole and S-pole blocks, such that the magnetic direction of the free magnetic layer is parallel or anti-parallel to the fixed magnetic layer. The induced change of the magnetoresistance further result in the obvious change of the output signal to the processor, and then the information of the object is sensed and calculated from the processor.

10 Claims, 8 Drawing Sheets

CONTACTLESS SENSING DEVICE

FIELD OF THE INVENTION

The present invention generally relates to an automatic control system, and more particularly to a contactless sensing device.

BACKGROUND OF THE INVENTION

The automatic sensing device of traditional industries is mainly applied to sense the parameters, such as position, speed, rotational speed (RPM) and count of the objects. We usually classify types of sensors as contact or contactless. The contact type has to directly contact with the tested object to get moving information, such as micro switch or limit switch, but it is not suitable for applying to precision component process because the contact area is easy to wear the surface of the tested object to affect the next precision process. The traditional contactless sensing device mainly uses magnetic induction technique or optical technique. The magnetic induction technique is mainly by using Hall Effect, which the change of magnetic flux from detecting the output current of a circuit results in an output voltage (Hall voltage), such as reed switch, proximity switch, or tachometer. But it has the disadvantages of being effected by electronic noise easily, being influenced by temperature variation, and consuming more power. The sensing device using optical technique is judging if the light beam emitted by a light source is received or not to output signals, and the basic elements of the device have to comprise an encoder, a light emitter and a light receiver. If the elements further comprise a processor, the cost will be high. In addition, the light beam has to emit straightly, so that it is not suitable for applying to narrow-space factory.

Furthermore, the installation of the traditional sensing device must depend on the shapes or applications of the tested object(s). It is limited to have to be arranged on the tested object(s) in advance, such as tachometer. The Hall sensor and the encoder have to be mounted on a shaft in advance to further sense the rotational speed of the shaft. If operators also want to measure the moving speed of the glass substrate, the rotational speed sensor, such as tachometer with the encoder, is not applicable to be used and another position sensor, such as micro switch or limit switch, must be further prepared and mounted. Therefore, the traditional sensing device has the disadvantages of the rigid installation, so that the applications are limited, and the additional or different spare parts with higher cost are prepared in advance. A novel contactless sensing device with flexible installation and portable function is necessary.

SUMMARY OF THE INVENTION

A first objective of this invention is providing a contactless sensing device, which is capable of sensing some specific information, such as position confirmation, speed determination, where to start and where to stop.

A second objective of this invention is providing a contactless sensing device, which has the effect of simple structure, lower cost and being applicable for a tested object without the consideration about its shape and material.

A third objective of this invention is providing a contactless sensing device, which has the flexible installing functions, such as portable and adhere-and-sense (similar to the function of "plug-and-play").

A fourth objective of this invention is providing a contactless sensing device, which has the advantages of space saving (or miniaturization), high sensitivity, noise immunity, and no effect on the original distribution of magnetic field of the factory process.

To achieve above objectives, a contactless sensing device is disclosed and comprises a magnetic stripe fixed on a tested object, a detector and a processor. The magnetic stripe has alternatively and equally arranged plurality of N-pole blocks and S-pole blocks. The detector has a fixed magnetic layer with a fixed magnetic direction, a free magnetic layer with a changeable magnetic direction influenced by an external magnetic field, and an insulating layer separated the fixed magnetic layer from the free magnetic layer. The processor electrically connects to the detector.

While the tested object is moving to make the magnetic stripe pass through the magnetic stripe, the magnetic direction of the free magnetic layer is influenced by the N-pole blocks and the S-pole blocks of the magnetic stripe, so that the magnetic direction of the free magnetic layer is parallel or anti-parallel to the magnetic direction of the fixed magnetic layer. The induced change of the magnetoresistance further result in the obvious change of the output signal to the processor, and then the information of the moving tested object is sensed and calculated from the processor.

Further features and advantages of the present invention will become apparent to those of skill in the art in view of the detailed description of preferred embodiments which follows, when considered together with the attached drawings and claims.

BRIEF DESCRIPTION OF THE DRAWINGS

All the objects, advantages, and novel features of the invention will become more apparent from the following detailed descriptions when taken in conjunction with the accompanying drawings.

DESCRIPTION OF THE PREFERRED EMBODIMENT

Figure 1:
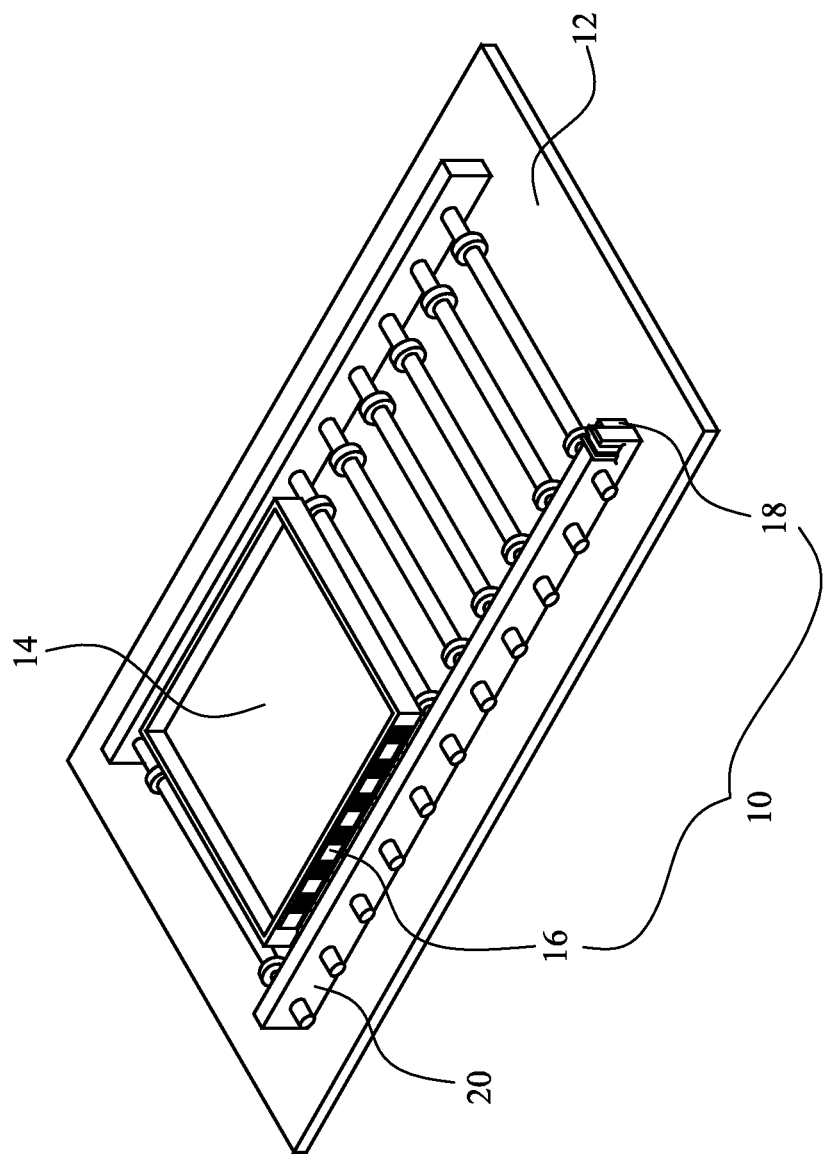
FIG. 1 shows a structured diagram of the contactless sensing device in accordance with the invention applying to an in-line process.

Referring now to the drawings where like characteristics and features among the various figures are denoted by like reference characters.

Please refer to FIG. 1, the first preferred embodiment of this invention is disclosed a contactless sensing device 10, which is applicable to automatic process and used for sensing some specific information of the process, such as counting, position confirmation, speed determination, where to start and where to stop. The structure of the automatic process comprises a transmission mechanism 12 and several carriers 14. Each one of the carrier 14 can be a tray. The carriers 14 is arranged on the transmission mechanism 12 and driven to move forwardly. The contactless sensing device 10 comprises a magnetic stripe 16 and a detector 18. The magnetic stripe 16 is fixed on the side of the carriers 14, and the detector 18 is arranged on a stand 20 of the transmission mechanism 12. When the carriers 14 are moved by the transmission mechanism 12, the magnetic stripe 16 is passing through the detector 18.

Figure 2:
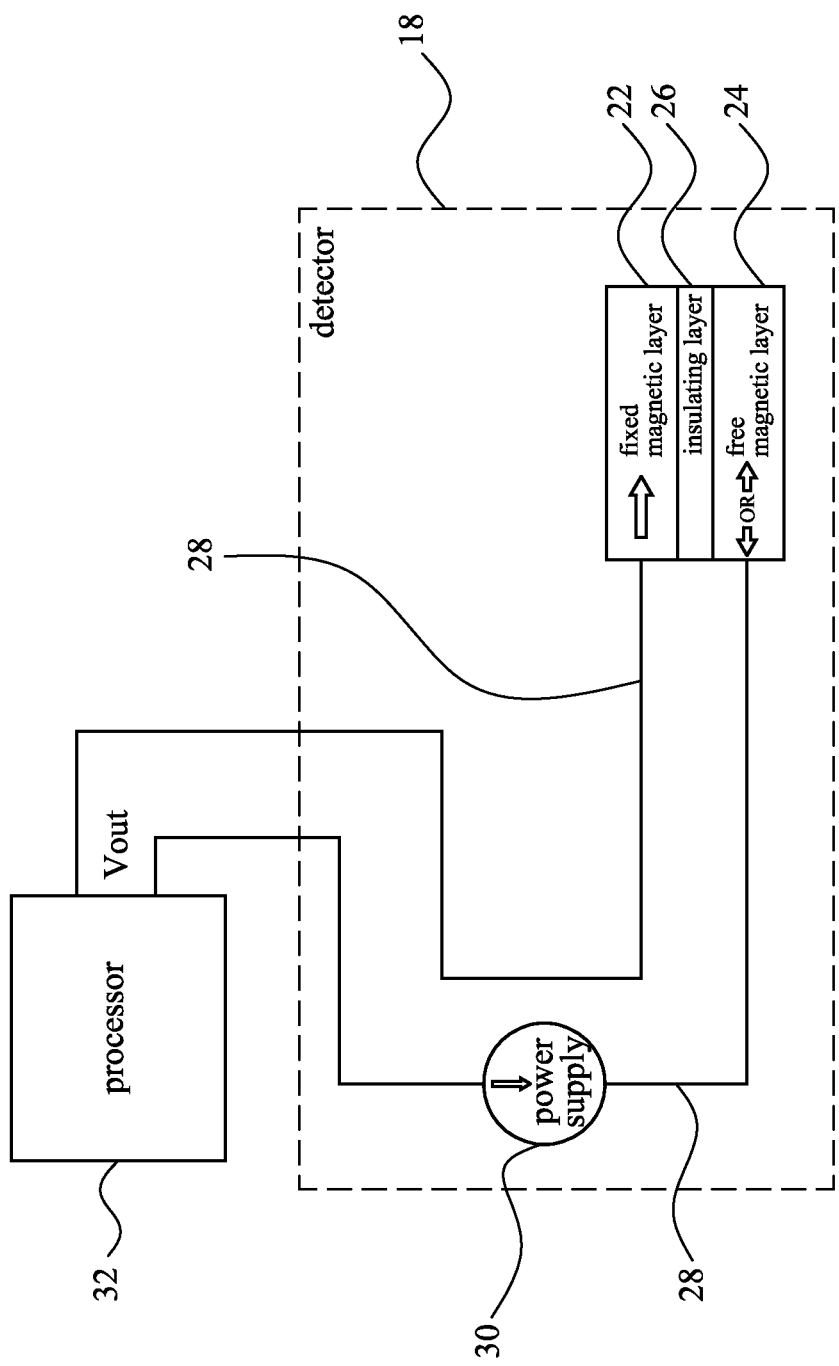
FIG. 2 shows a schematic diagram of a first preferred embodiment of the detector in accordance with the invention.

Please refer to FIG. 2, the detector 18 has a fixed magnetic layer 22, a free magnetic layer 24 and a insulating layer 26 separated the fixed magnetic layer 22 from the free magnetic layer 24, two signal lines 28 electrically connected to the fixed magnetic layer 22 and the free magnetic layer 24 respectively, a power supply 30 electrically connect to the signal lines 28 and providing a constant current to the fixed magnetic layer 22 and the free magnetic layer 24, and a processor 32 electrically connected to the signal lines 28. The magnetic direction of the fixed magnetic layer 22 is not influenced by an external magnetic field. Even the external magnetic field disappears, the magnetism and the magnetic direction still exist on the fixed magnetic layer 22. The material of fixed magnetic layer 22 can be a metal or an oxide with electric conductivity and magnetism, such as $Fe_{81-X}Co_XGa_{19}$. However, the magnetic direction of the free magnetic layer 24 can be influenced by an external magnetic field. The material of the free magnetic layer 24 can be a metal or an oxide with electric conductivity and magnetism, such as NiFe. The insulating layer 26 can be a non-magnetic layer (e.g. Cu) or an isolating layer (e.g. Aluminum Oxide). The magnetic stripe 16 is flexible with alternatively and equally arranged plurality of N-pole blocks and S-pole blocks. The deep color of FIG. 1 represents the N-pole block, and the light color of FIG. 1 represents the S-pole block.

The principle of operation of detector 18 is described as follow. The electron has the spin physical characteristic, which includes a spin-up electron and a spin-down electron. The electrons parallel to the magnetic moment of the magnetic layer are scattered less and perform low resistance. But the electrons anti-parallel to the magnetic moment of the magnetic layer are easily collided with the magnetic moment of the magnetic layer and perform high resistance. If the magnetic direction of the free magnetic layer 24 is the same as the magnetic direction of the fixed magnetic layer 22, the spin of electrons anti-parallel to the magnetic moments of the fixed magnetic layer 22 and the free magnetic layer 24 are obstructed to scatter, but the electrons with parallel spin are easy to conduct. Therefore, the total resistance is relatively lower, so that the output voltage $V_{out}$ received by the processor 32 is relatively higher. If the magnetic moment direction of the free magnetic layer 24 is opposite to the magnetic moment direction of the fixed magnetic layer 22, no matter what the spin-up electrons or spin-down electrons are obstructed to scatter by the fixed magnetic layer 22 or the free magnetic layer 24, and the total resistance is relatively higher, so that the output voltage $V_{out}$ received by the processor 32 is relatively lower. The digital signals of "0" or "1" can be obviously judged based on the magnitude of the output voltage $V_{out}$ received by the processor 32. Similarly, if the power supply 30 provides constant voltage, the output current received by the processor 32 is changed obviously and the "0" and "1" can be judged based on the magnitude of the output current.

Figure 3:
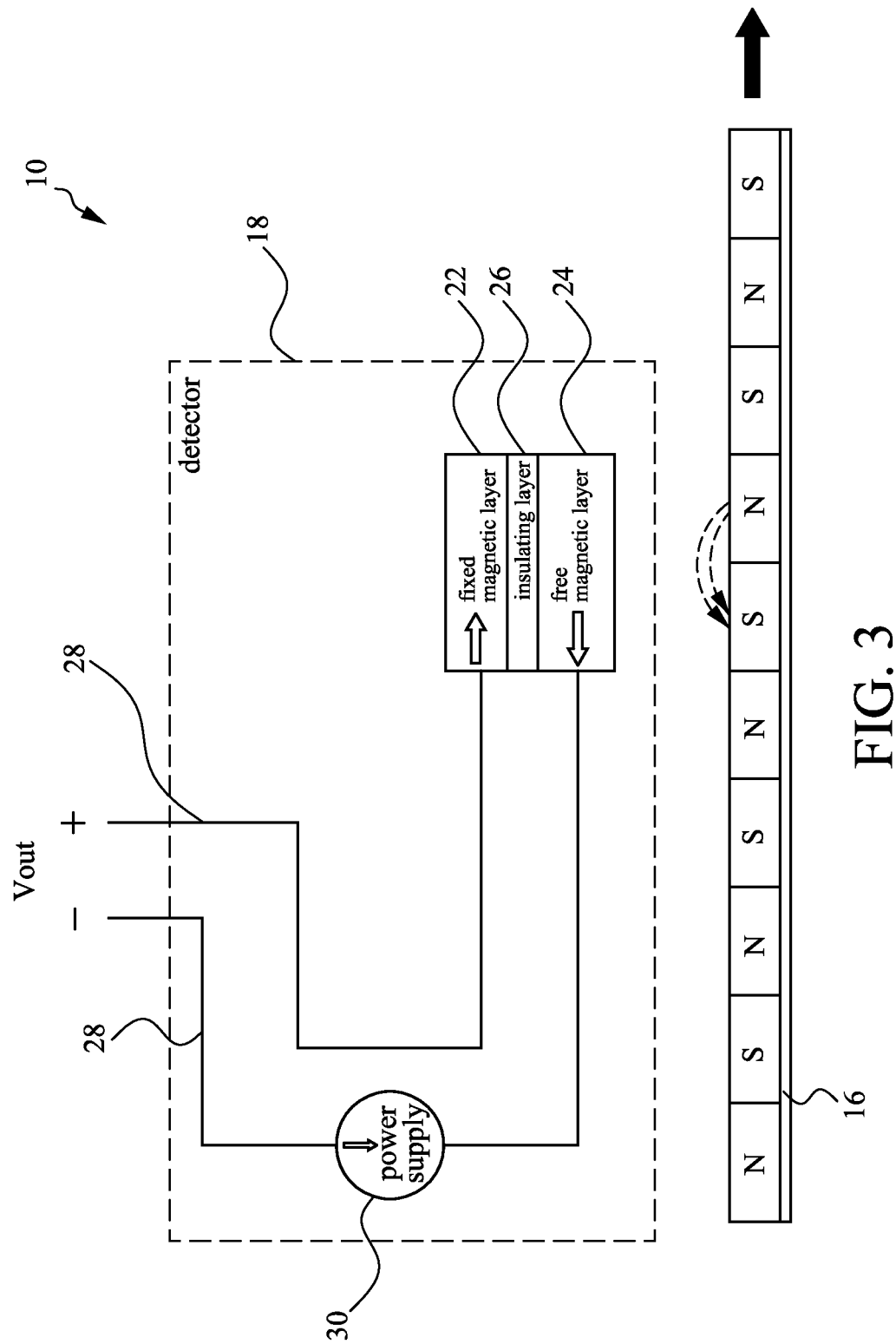
FIG. 3 shows a schematic diagram of the first preferred embodiment in accordance with the invention, wherein the magnetic direction of the free magnetic layer is influenced by the magnetic stripe and changed to be anti-parallel to the magnetic direction of the fixed magnetic layer.
Figure 4:
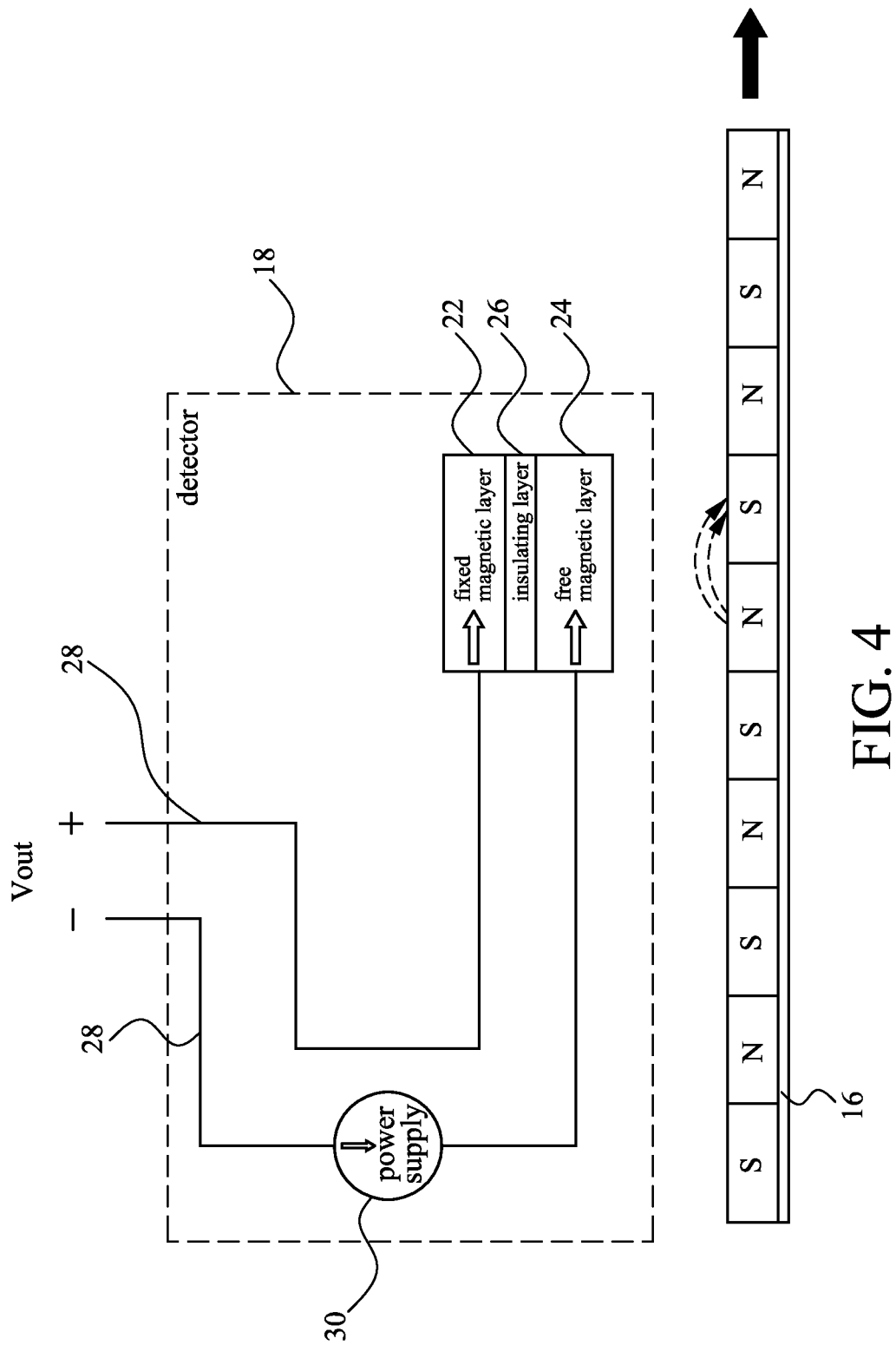
FIG. 4 shows a schematic diagram of the first preferred embodiment in accordance with the invention, wherein the magnetic direction of the free magnetic layer is influenced by the magnetic stripe and changed to be parallel to the magnetic direction of the fixed magnetic layer.

When the carriers 14 move forwardly, the magnetic stripe 16 passes through the detector 18. Please refer to FIG. 3, when the magnetic field produced from the N-pole blocks and the S-pole blocks of the magnetic stripe 16 influences on the free magnetic layer 24, it results in the magnetic direction of the free magnetic layer 24 anti-parallel to the magnetic direction of the fixed magnetic layer 22, and the resistance is higher and hence the output voltage $V_{out}$ is lower. On the contrary, please refer to FIG. 4, when the magnetic field produced from the N-pole blocks and the S-pole blocks of the magnetic stripe 16 influences on the free magnetic layer 24, it results in the magnetic direction of the free magnetic layer 24 parallel to the magnetic direction of the fixed magnetic layer 22, the resistance is lower and hence the output voltage $V_{out}$ is higher. It means that the processor 32 senses a series of the "0" and "1" signals to calculate the speed of the carriers 14 and other motion information. Because the detector 18 can be influenced by the weak change of magnetic field resulting from the magnetic stripe 16 to reveal obvious change of magnetoresistance. Therefore, the contactless sensing device 10 has the advantages of high sensitivity, noise immunity, and lower power consumption. In addition, the detector 18 has extremely high sensitivity for judging tiny magnetic blocks, such that its size can be minimized to match extreme factory space requirement, such as the pickup of the hard disk.

Figure 5A:
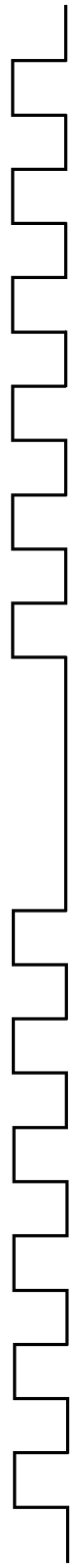
FIG. 5A to 5D show a schematic diagram of each normal signal and each abnormal signal.
Figure 5B:
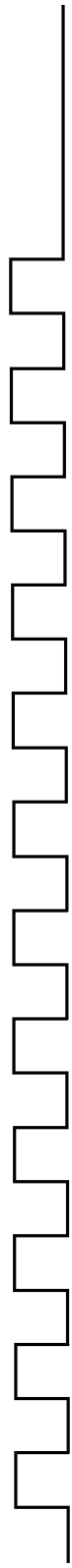
Figure 5C:
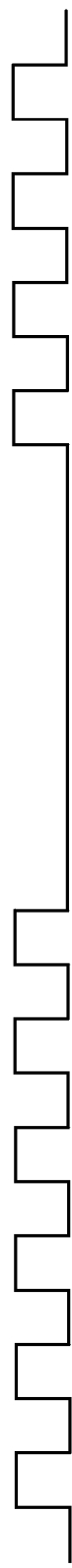
Figure 5D:
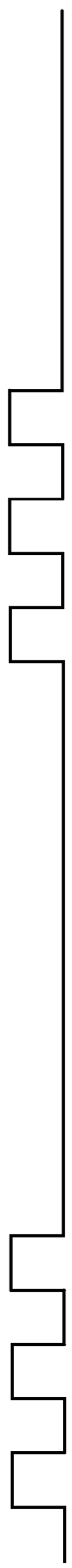

Please refer to FIG. 5A, which shows the signals' status transmitted from the detector 18 in normal operation, wherein the sections with "0" and "1" signals equally separated and continuously appeared represent the carriers 14 passed through, the sections without signal represent no carrier 14 passed through. The pattern of signals can be applied to calculated the desired information of carriers 14 (e.g. position or speed) by processor 32 as follow. Firstly, the carrier 14 has reached the predetermined position when one detector 18 senses a "1" signal, and then to process the next specific motion (e.g. deceleration or turning). Secondly, the processor 32 can calculates the speed of the carrier 14 by time difference Δt between two "1" signals. Thirdly, after the "1" signal appears, the counter of the processor 32 starts and calculates the accumulative number of carriers 14 with the total number of "1" signals divided by the number of "1" signals in each carrier 14. Finally, the device 10 can further sense whether the carriers 14 move normally or not. For example, if six sets of N-pole blocks and S-pole blocks are arranged on each carrier 14, an abnormal signal (shown as FIG. 5B) appears continuously and represents two adjacent carriers 14 so close that they may have stacked together. The next carrier 14 is slipped or jammed (shown as FIG. 5C) to result in the "0" signal being separated to long. The angle of the carrier 14 has been shifted (shown as FIG. 5D) to result in the number of sensed "0" and "1" signals being incomplete (i.e. less than 6). If the abnormal signals are sensed, it is capable of real-time reporting back to operators to shut down, so as to prevent more follow-up damages. This is not achieved by prior art of traditional sensing device (e.g. micro switch or limit switch).

Figure 6:
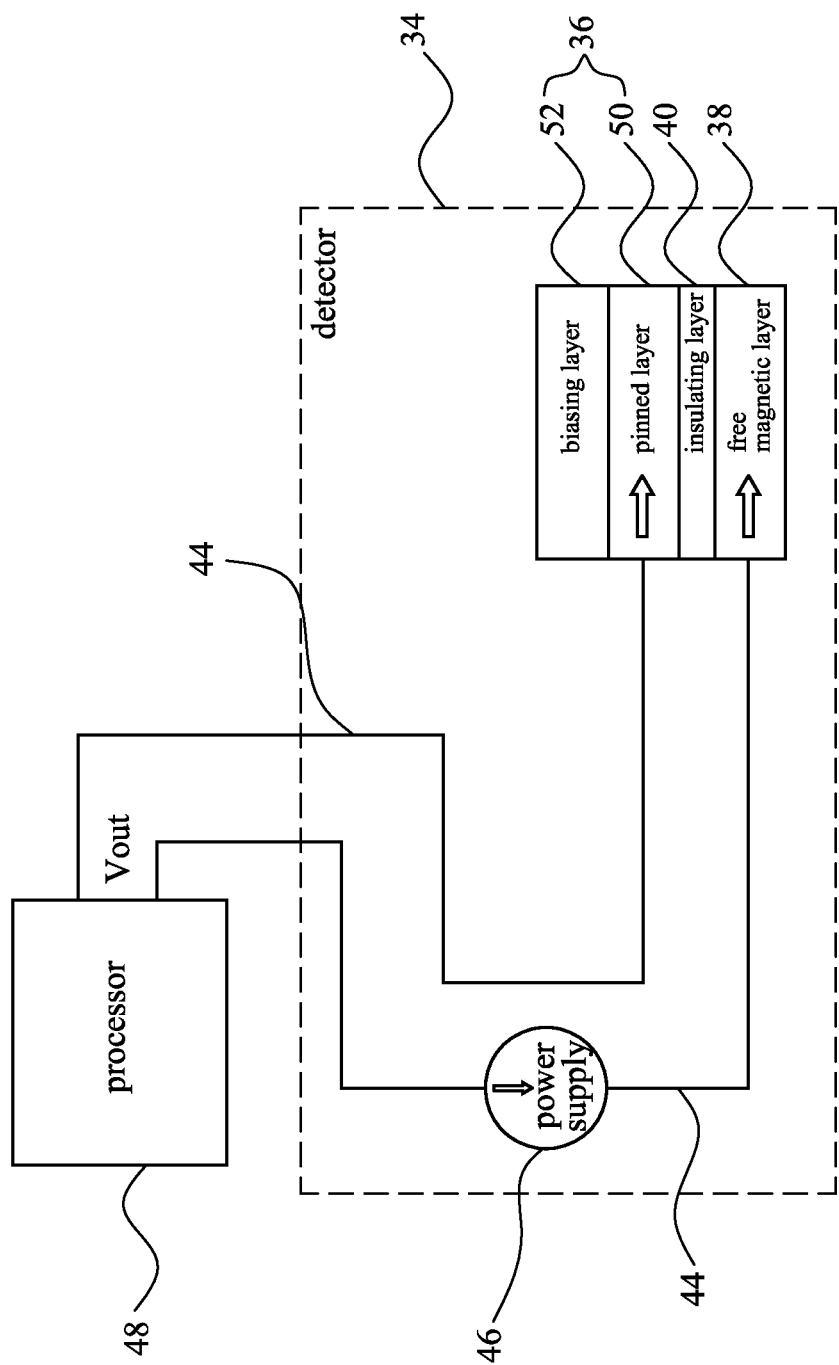
FIG. 6 shows a schematic diagram of a second preferred embodiment of the detector in accordance with the invention.

The detector 34 of the second preferred embodiment (shown as FIG. 6) comprises a fixed magnetic layer 36, a free magnetic layer 38, an insulating layer 40 separated the fixed magnetic layer 36 from the free magnetic layer 38, two signal lines 44 electrically connected to the fixed magnetic layer 36 and the free magnetic layer 38 respectively, a power supply 46 electrically connected to the signal lines 44 to provide a constant current, and a processor 48 electrically connected to the signal lines 44. The characteristic is that the fixed magnetic layer 36 has a pinned layer 50 and a biasing layer 52. The pinned layer 50 contacts with the insulating layer 40. The biasing layer 52 is an anti-ferromagnetic material, such as FeMn, and used to fix the magnetic direction of the fixed magnetic layer 50. The function of the detector 34 of the second embodiment is the same as above mentioned, so it is not described in detail.

Figure 7:
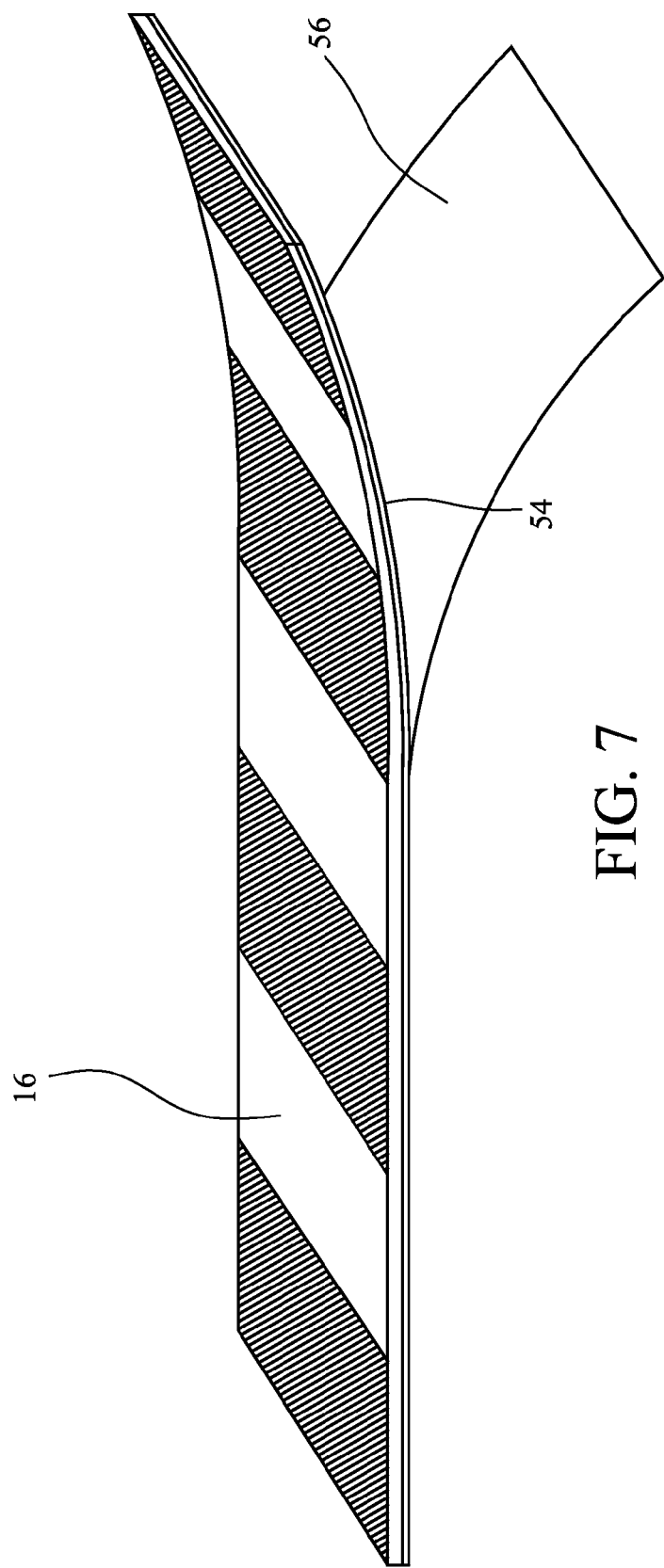
FIG. 7 shows a structured diagram of the magnetic stripe in accordance with the invention.
Figure 8:
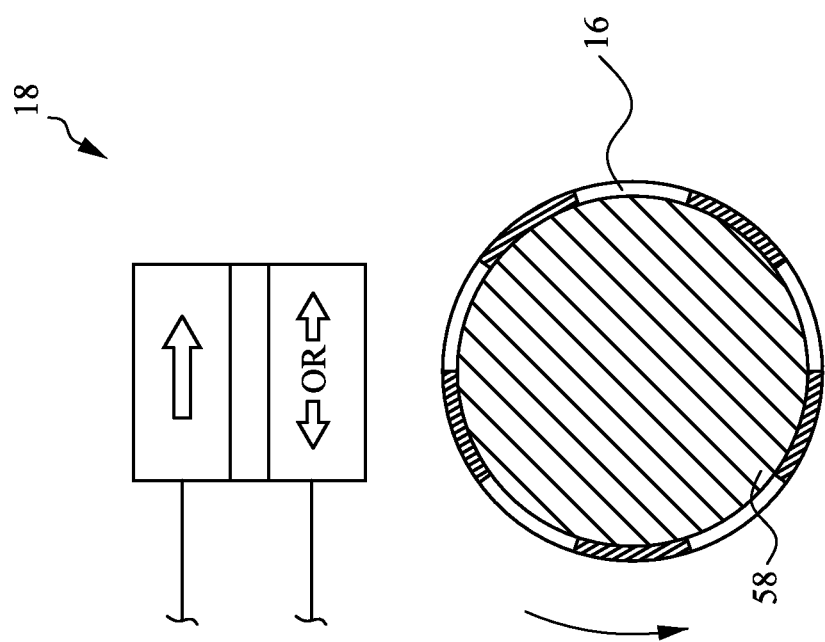
FIG. 8 shows schematic diagram of the contactless sensing device in accordance with the invention applying to sensing a shaft.

Another important characteristic of the contactless sensing device, please refer to FIG. 7, is that the magnetic stripe 16 is flexible. A gum 54 can be arranged at the back of the magnetic stripe 16, and a release film 56 is attached on the gum 54. Therefore, the magnetic stripe can be applied to sense information of a moving tested object without the consideration about its shape and material. The novel contactless sensing device has the advantages of simple structure and space saving (or miniaturization). Even weak external magnetic field resulting from the magnetic stripe 16 also can influence effectively the magnetic direction of the free magnetic layer of the detector. However, it results no effect on the original distribution of magnetic field of the factory process. Therefore, the magnetic stripe 16 can be a magnetic tape, and the alternatively and equally arranged N-pole blocks and S-pole blocks are formed after magnetizing. No matter what the shape of the tested object is and if the material of the tested object is magnetic or not, it is easy to install and has the flexible installing function, such as portable and adhere-and-sense (similar to the function of "plug-and-play"), and further to achieve the advantages of easy installation, space saving (or miniaturization), lower power consumption, and no effect on the original distribution of magnetic field in the factory process. Please refer to FIG. 8, the magnetic stripe 16 is fixed on a shaft 58 and the detector 18 is arranged at a proper position, and then the RPM of the shaft 58 can be sensed and calculated from the processor as above mentioned.

Although the invention has been explained in relation to its preferred embodiment, it is not used to limit the invention. It is to be understood that many other possible modifications and variations can be made by those skilled in the art without departing from the spirit and scope of the invention as hereinafter claimed.

What is claimed is:

1. A contactless sensing device for sensing an information of a moving tested object, the device comprising:
    a magnetic stripe, having alternatively and equally arranged plurality of N-pole blocks and S-pole blocks;
    a detector, including a fixed magnetic layer with a fixed magnetic direction, a free magnetic layer with a changeable magnetic direction influenced by an external magnetic field, an insulating layer separated the fixed magnetic layer from the free magnetic layer, two signal lines electrically connected to the fixed magnetic layer and the free magnetic layer respectively, and a power supply electrically connected to the signal lines; and
    a processor, electrically connected to the signal lines;
    wherein the magnetic stripe is fixed on the moving tested object, the detector is arranged at a proper position, while the moving tested object is moving to make the magnetic stripe pass through the detector, the changeable magnetic direction of the free magnetic layer is influenced by the N-pole blocks and the S-pole blocks of the magnetic stripe to result in parallel or anti-parallel to the magnetic direction of the fixed magnetic layer, and the induced changes of the magnetoresistance further result in the changes of the output signals to the processor, and then the information of the moving tested object is sensed and calculated from the processor.

2. The device as claimed in claim 1, wherein the fixed magnetic layer is a metal or an oxide with electric conductivity and magnetism.

3. The device as claimed in claim 1, wherein the free magnetic layer is a metal or an oxide with electric conductivity and magnetism.

4. The device as claimed in claim 1, wherein the insulating layer is a non-magnetic metal layer or an isolating layer.

5. The device as claimed in claim 4, wherein the insulating layer is Cu or Aluminum Oxide.

6. The device as claimed in claim 1, wherein the fixed magnetic layer having a pinned layer and a biasing layer, the pinned layer is contacting with the insulating layer and the biasing layer is used to fix the magnetic direction of the pinned layer.

7. The device as claimed in claim 6, wherein the biasing layer is an anti-ferromagnetic material.

8. The device as claimed in claim 1, wherein the magnetic stripe is flexible.

9. The device as claimed in claim 8, wherein a gum is arranged at the back of the magnetic stripe.

10. The device as claimed in claim 9, wherein a release film is attached on the gum, and the magnetic stripe is adhered on the moving tested object after peeling the release film away.

* * * * *